United States Patent [19]

Pearson

[11] 4,358,328
[45] Nov. 9, 1982

[54] TAPE-CUTTING BLADE ATTACHING METHOD

[75] Inventor: Walter C. Pearson, St. Paul, Minn.

[73] Assignee: Minnesota Mining and Manufacturing Company, St. Paul, Minn.

[21] Appl. No.: 225,519

[22] Filed: Jan. 16, 1981

Related U.S. Application Data

[63] Continuation of Ser. No. 30,823, Apr. 17, 1979, abandoned.

[51] Int. Cl.³ .......................... B29C 27/08; B26D 1/02
[52] U.S. Cl. ...................................... 156/73.1; 225/65; 225/66; 225/91
[58] Field of Search ...................... 225/48, 50, 65, 66, 225/91, 92; 156/73.1

[56] References Cited

U.S. PATENT DOCUMENTS

| | | | |
|---|---|---|---|
| 2,316,469 | 4/1943 | Thor | 225/48 |
| 2,676,658 | 4/1954 | King | 225/65 X |
| 2,942,748 | 6/1960 | Anderson | 156/73.1 X |
| 3,016,174 | 1/1962 | Perkins | 225/48 X |
| 3,088,640 | 5/1963 | Kunsch | 225/48 |
| 3,158,303 | 11/1964 | Pepitto | 225/66 |
| 3,178,086 | 4/1965 | Palmer | 225/48 X |
| 3,184,353 | 5/1965 | Balamuth et al. | 156/73.1 |
| 3,367,809 | 2/1968 | Soloff | 156/73.1 |
| 3,417,935 | 12/1968 | Douglas et al. | 225/66 X |
| 3,477,624 | 11/1969 | Branyon et al. | 225/80 X |
| 3,684,141 | 8/1972 | Hall | 225/65 |
| 3,771,700 | 11/1973 | Garr | 225/48 X |
| 4,106,962 | 8/1978 | Adams et al. | 156/73.1 |

*Primary Examiner*—Frank T. Yost
*Attorney, Agent, or Firm*—Cruzan Alexander; Donald M. Sell; William L. Huebsch

[57] ABSTRACT

A method for anchoring a metal tape-cutting blade to a thermoplastic resin frame of a tape dispenser. The plate is pierced to produce a plurality of plate portions projecting around an opening. The projections are positioned against the frame. Ultrasonics are used to locally heat the frame while the projections are pressed into it, whereupon a portion of the thermoplastic frame material flows into the opening between the projections and upon solidification holds the blade in place.

2 Claims, 4 Drawing Figures

TAPE-CUTTING BLADE ATTACHING METHOD

This is a continuation of application Ser. No. 30,823 filed Apr. 17, 1979, now abandoned.

BACKGROUND OF THE INVENTION

This invention relates to methods and structures for attaching metal plates to members made of thermoplastic resin, and in one aspect to means for attaching a metal tape-cutting blade to a frame of a tape dispenser made of thermoplastic resin.

Many different inexpensive tape dispensers have been made to facilitate dispensing lengths of tape from a supply length of tape wrapped around a core.

Typically such dispensers have included a frame formed of thermoplastic resin, means on the frame for defining a path for the supply length of tape including means for rotatably mounting the tape core, and means along the path for defining a cutting edge transverse of the path adapted to transversely sever tape along the path when the tape and cutting edge are pressed against each other.

For many tapes dispensed from such dispensers (e.g., tapes with acetate backing layers), the means along the path for defining a tape cutting edge can be a serrated edge formed on the thermoplastic resin frame itself. Other tapes, however, have backing layers of materials (e.g., polypropylene) which are sufficiently difficult to cut that such serrated edges are not suitable and a metal plate having an edge adapted to cut the tape (called a tape-cutting blade herein) must be attached to the frame of the dispenser. Heretofore attaching such a tape-cutting blade has then presented certain problems. One prior art method of attaching such a blade includes forming spaced openings in the tape-cutting blade, molding appropriately spaced posts on the thermoplastic resin frame of the dispenser, positioning the posts through the openings in the tape-cutting blade, and then heat forming heads on the posts as by the use of ultrasonics to retain the cutting blade in place. While such a method provides good attachment, tape dispenser frames having such posts must have the metal tape-cutting blade attached to them even when they are to be used with tape that could be easily cut on an edge of the frame, because if the blade were not attached the posts would project into and obstruct the tape path.

SUMMARY OF THE INVENTION

According to the present invention there is provided a method for attaching a metal tape-cutting blade to a thermoplastic resin frame of a tape dispenser of the type described above without the need to premold special attachment members such as posts on the frame of the dispenser so that a tape dispenser frame of one design can either be used without the tape-cutting blade as the entire dispenser when only an edge of the frame is needed to cut the tape, or can have the tape-cutting blade attached to the frame when it is needed to cut the tape to be dispensed. While the novel attachment method is described for use in attaching metal plates that have a cutting edge to provide a tape-cutting blade for a tape dispenser made of thermoplastic resin, the attaching method has broad application beyond that specifically described for attaching metal plates to members made of thermoplastic resin.

The method of attachment according to the present invention includes the steps of piercing the plate at a number of locations to provide at each location a plurality of generally triangular plate portions projecting generally normally from a first surface of the plate with an opening through the plate and between the plate portions which opening is larger in cross sectional area adjacent the bases of the plate portions than adjacent the distal ends of the plate portions; placing the distal ends of the plate portions against the member; heating the member around the projections to locally soften the thermoplastic resin; pressing the plate portions into the softened thermoplastic resin so that the thermoplastic resin flows into the opening; and allowing the heated theremoplastic resin to cool. This method will embed the projecting plate portions in the member and provide a portion of the thermoplastic resin of the member that essentially fills the opening and has a larger cross sectional area adjacent the bases of the plate portions than adjacent the distal ends of the projections where that portion of the member filling the opening is attached to the rest of the member, so that the portion of the member cannot be withdrawn from the opening and securely anchors the metal plate.

Since this method of attachment does not require that any special attachment member be provided on the thermoplastic resin member, it is very useful for adding metal cutting blades to frames of tape dispensers made of thermoplastic resin when such cutting blades are needed to cut the tape to be dispensed, which thermoplastic resin frames can otherwise be used as dispensers without the metal cutting blades when the tapes to be dispensed by the dispensers can be cut across a serrated edge on the thermoplastic resin frames.

Preferably the localized heating of the thermoplastic resin is done ultrasonically. Here also the method provides an advantage in that the ultrasonic horn used can have a planar surface rather than a special arcuate shaped surface such as that needed to form heads on posts.

BRIEF DESCRIPTION OF THE DRAWING

The present invention will be further described with reference to the accompanying drawing wherein like numbers refer to like parts in the several views, and wherein.

DESCRIPTION OF THE PREFERRED EMBODIMENT

Figure 1:
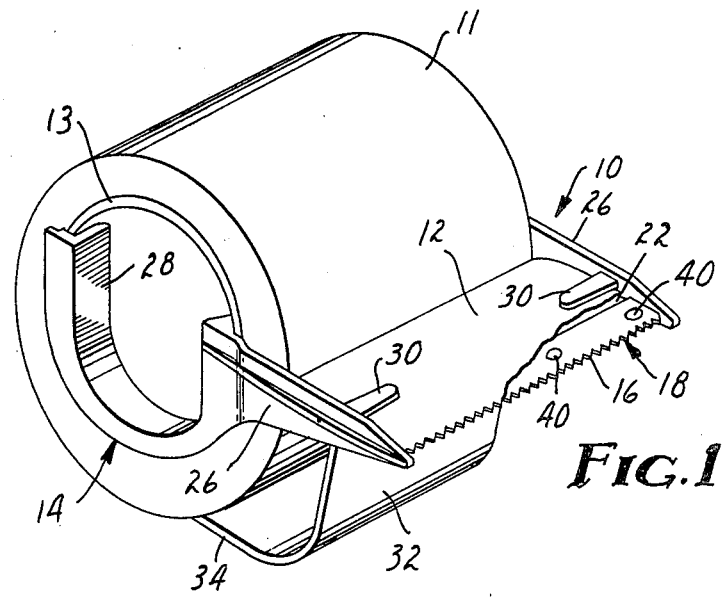
FIG. 1 is a perspective view of a dispenser according to the present invention including a metal cutting blade attached to a thermoplastic resin frame of the dispenser by the method according to the present invention.

Referring now to the drawing there is shown a dispenser 10 according to the present invention for a roll of tape 11 including a supply length of tape 12 wound on a core 13, which dispenser 10 comprises a frame 14 integrally molded of a thermoplastic resin (e.g., polystyrene) and a thin metal plate having a tape-cutting edge 16 (called a cutting blade 18 herein) attached to the frame 14 by a method according to the present invention.

The frame 14 of the dispenser 10 comprises an elongate generally planar support portion 20 having a planar tape support surface 22 which helps to define a tape path through the dispenser 10, and a plurality of spaced teeth-like portions 24 (FIG. 4) along one edge of the support portion 20 which provide a serrated edge 25 for the support surface 22 which edge 25 could be used to cut tape if the cutting blade 18 were not attached. Side wall portions 26 of the frame 13 are attached at the ends of the support portion 20, have arcuate opposed parts 28 adapted to project into the opposite ends of an opening in the core 13 to support the roll of tape 11 for rotation thereabout, and are resiliently flexible between the arcuate parts 28 and the support portion 20 so that they can be resiliently bent apart to afford positioning the tape roll between the arcuate parts 28. Opposed locating tab portions 30 of the frame 14 project from the side wall portions 26 in spaced relationship over the support surface 22 to help define the path for tape through the dispenser 10 therebetween and to help retain a newly severed end portion of tape along the support surface 22. An arched portion 32 of the frame 13 is joined to the edge of the support portion 20 opposite the serrated edge 25 and extends partially around the roll of tape 11. The arched portion 32 has a generally planar part 34 on which the dispenser 10 can be supported, and is adapted to be received in the palm of a user's hand to space the user's hand from the rotating roll of tape 11 as tape 12 is being dispensed.

To use the dispenser 10, a user typically pulls a length of the tape 12 from the support surface 22 (which tape 12 is initially disposed adhesive side up between the tab portions 30 and the support surface 22), applies the end of the tape to the item to be taped, and pulls on the dispenser 10 away from the item to dispense the desired length of tape 12. He then orients the dispenser 10 to press the cutting edge 16 of the tape-cutting blade 18 against the adjacent tape 12 so that the edge 18 transversely severs the tape 12.

The tape-cutting blade 18 is a relatively thin metal plate (e.g., 2⅛ inch by 5/16 inch by 0.008 inch steel plate) which has evenly spaced teeth along one side to provide the cutting edge 16. Preferably for the sake of safety the teeth have rounded tips and are formed by shearing the plate from its side adjacent the support surface 22 to provide burrs on the edges of the teeth adjacent the tape 12 which burrs facilitate cutting the tape 12.

Figure 2:
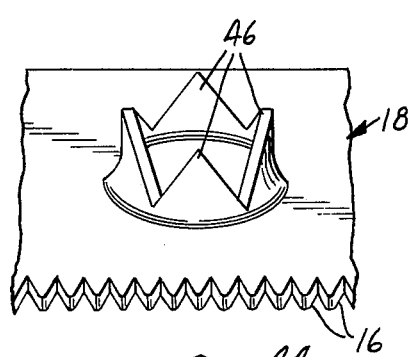
FIG. 2 is an enlarged fragmentary view schematically illustrating a piercing step employed in the method for attaching the cutting blade shown in FIG. 1.
Figure 2:
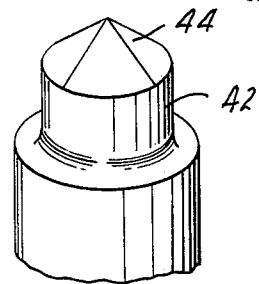
Figure 3:
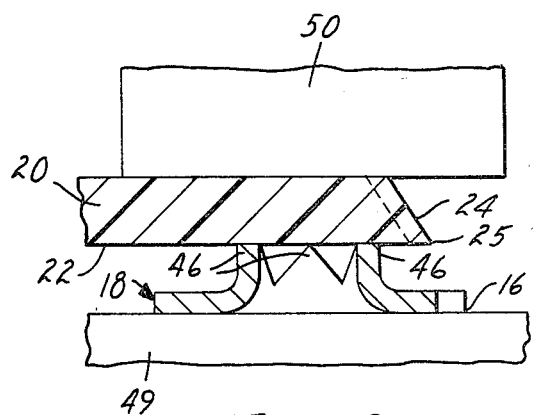
FIGS. 3 and 4 are enlarged fragmentary sectional views which schematically illustrate the positions of the frame of the dispenser and the cutting blade just prior to and after they are joined by the method according to the present invention.
Figure 4:
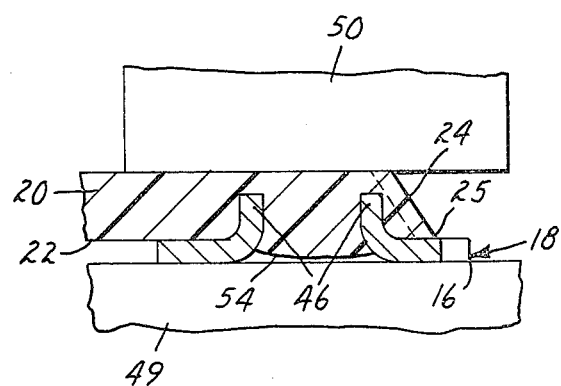

The method for attaching the tape-cutting blade 18 is sequentially illustrated in FIGS. 2, 3 and 4.

First the blade 18 is pierced (FIG. 2) in a plurality of spaced locations 40 by a punch 42 having a pyramidal shaped tip 44 to form at each location 40 a plurality of (four) generally triangular plate portions 46 bent and radiused at their bases where they join the rest of the plate to project generally normally from a first surface 48 of the blade 18 and to provide an opening through the blade 18 and between the projecting plate portions 46 at each location 40, which opening is larger in cross sectional area adjacent the bases of the plate portions 46 than adjacent the distal ends of the plate portions 46.

Next, as is shown in FIG. 3, the distal ends of the projecting plate portions 46 are placed against the support portion 20 of the frame 14 (which portion 20 is supported on a support block 49), and the support portion 20 of the frame 14 is locally heated around the plate portions 46 (preferably by ultrasonics as by an ultrasonic horn 50) to locally soften the thermoplastic resin of the frame 14 while the plate portions 46 are pressed into the softened thermoplastic resin so that the thermoplastic resin of the frame 14 flows into the openings between the plate portions 46 at the locations 40. The thermoplastic resin is then allowed to cool. As is best seen in FIG. 4, this produces portions 54 of the thermoplastic resin of the frame 14 which fill the openings at the locations 40 and which have larger cross sectional areas adjacent the bases of the plate portions 46 than adjacent the distal ends of the plate portions 46 so that those portions 54 of the thermoplastic resin cannot be withdrawn and solidly anchor the tape-cutting blade 18 to the frame 14.

Additionally it may be desirable to stress the plate portions 46 when they are formed so that they fracture adjacent their bases to form barbs (not shown) like those at the base of an arrow head, which barbs will provide further anchorage of the plate portions 46 in the thermoplastic resin of the frame 14.

I claim:

1. A method for modifying a tape dispenser including a frame of thermoplastic material comprising means for defining a path for a supply length of tape and a portion transverse of the path having a cutting edge transverse of the path adapted to transversely sever some types of tape along the path when the tape and the cutting edge are pressed against each other, which modification adapts the dispenser so that the dispenser can sever other harder to cut types of tape, said method comprising the steps of:
    providing a metal plate having a cutting edge adapted to cut the harder to cut types of tape;
    piercing the plate at a number of locations to provide at each location a plurality of generally triangular plate portions projecting generally normally from a first surface of the plate and an opening through the plate and between the plate portions, which opening is larger in cross-sectional area adjacent the bases of the plate portions than adjacent the distal ends of the plate portions;
    placing the distal ends of the plate portions against the frame portion along the path with the surface of the plate adjacent the frame overlying the cutting edge on the frame and with the cutting edge on the plate transverse of the path in a position to transversely sever tape along the path;
    heating the frame portion around the plate portions to locally soften the thermoplastic resin of the frame portion;
    pressing the plate portions into the softened thermoplastic resin so that the thermoplastic resin flows into and generally fills the opening; and
    allowing the heated thermoplastic resin to cool.

2. A method according to claim 1 wherein said heating step is performed by causing relative movement between the plate portions and the frame portion.

* * * * *